Jan. 18, 1949.　　　　F. W. LITTEN　　　2,459,230
FOOD CHOPPER WITH ROTARY FORCER SCREW
Filed Dec. 8, 1944　　　　　　　　　　　2 Sheets-Sheet 1
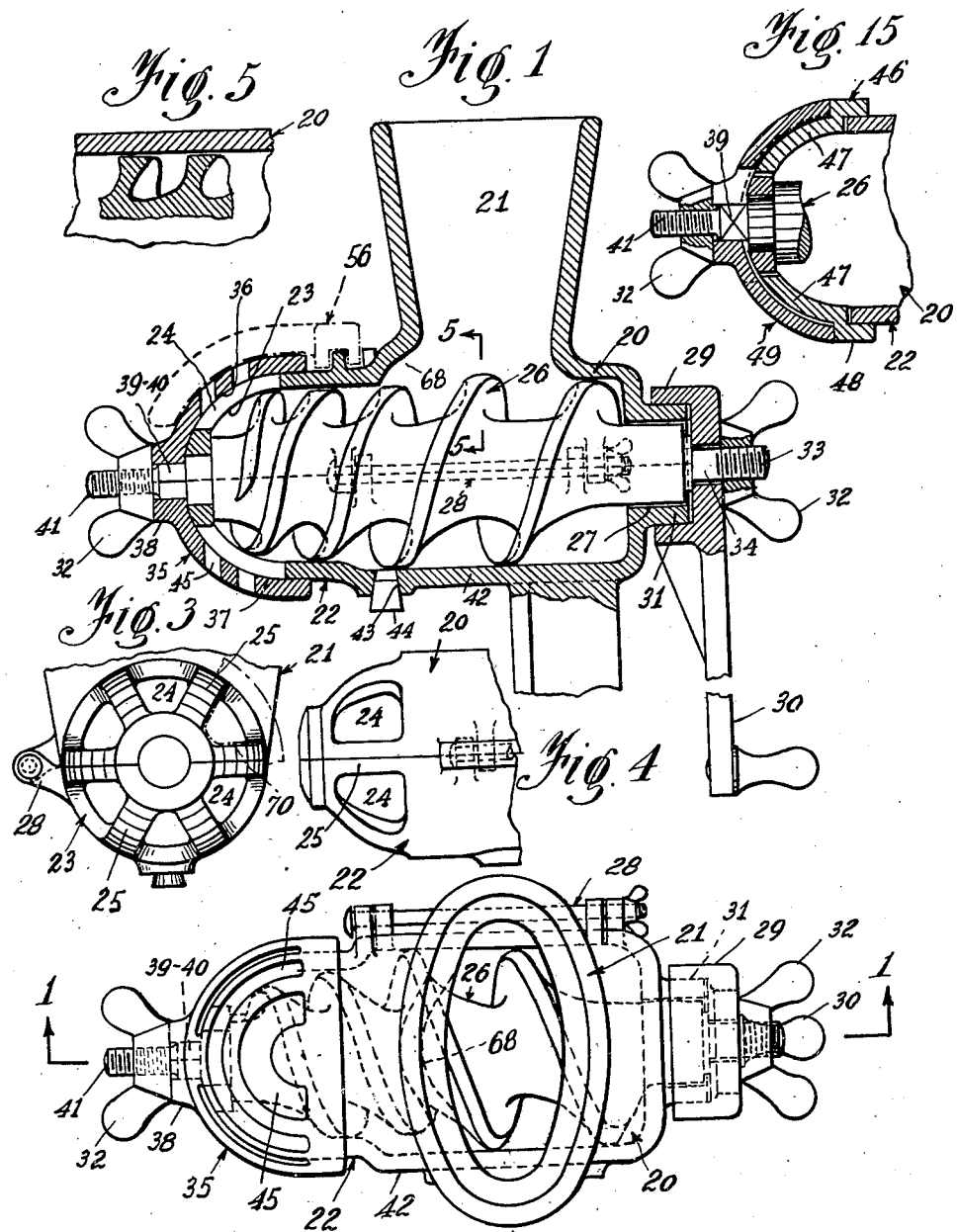
Fred W. Litten,
INVENTOR.
BY Ralph Donath
Attorney Jan. 18, 1949.    F. W. LITTEN    2,459,230
FOOD CHOPPER WITH ROTARY FORCER SCREW
Filed Dec. 8, 1944    2 Sheets-Sheet 2
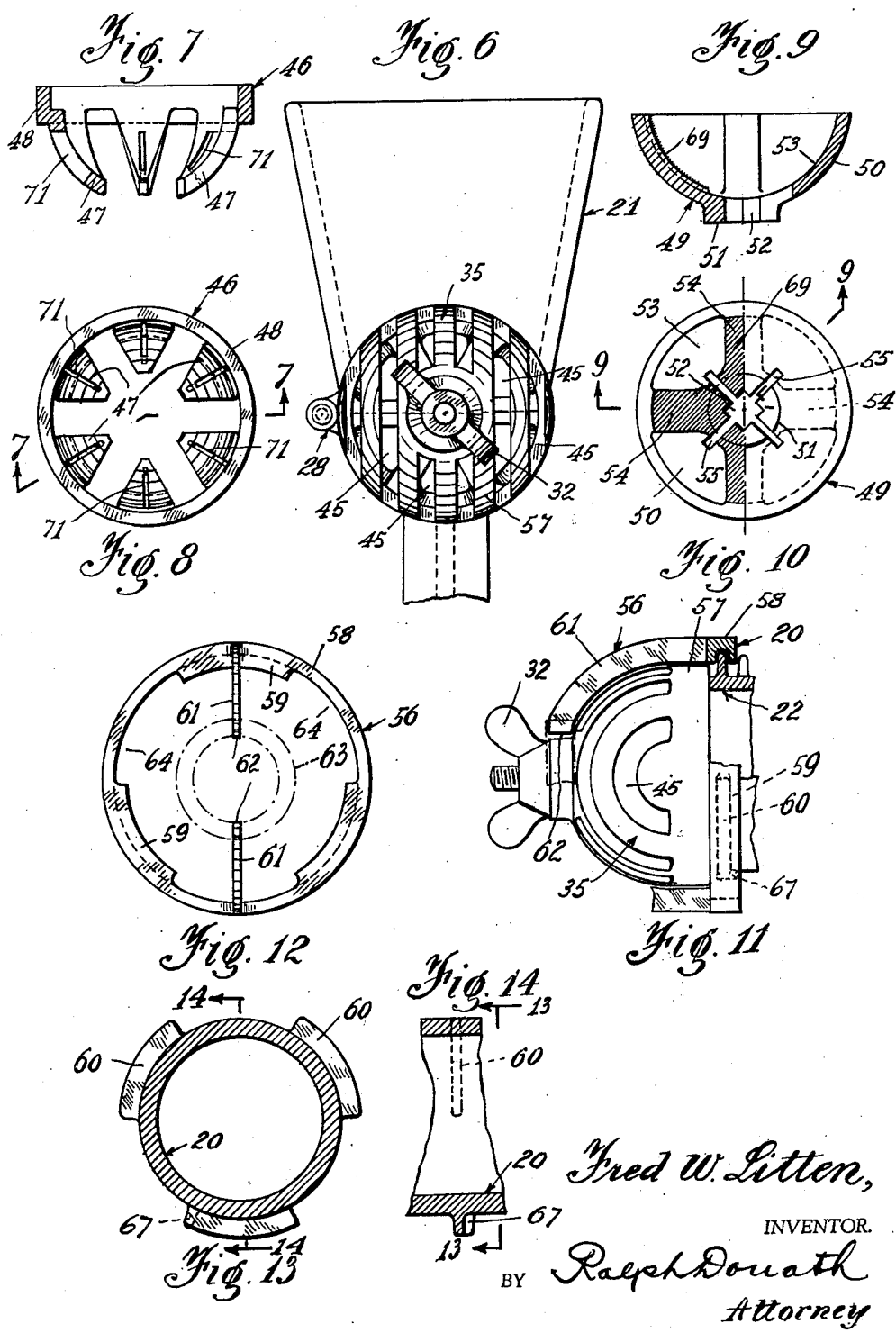
Fred W. Litten,
INVENTOR.
BY Ralph Donath
Attorney Patented Jan. 18, 1949

2,459,230

UNITED STATES PATENT OFFICE 2,459,230

FOOD CHOPPER WITH ROTARY FORCER SCREW

Fred W. Litten, Zelienople, Pa.

Application December 8, 1944, Serial No. 567,190

2 Claims. (Cl. 146—182)

This invention relates to food choppers and more in particular to that type in which raw or cooked meat, fruit, vegetables or other food may be chopped up in fine or coarse, uniform bits, it also may be used for pulverizing dry bread or as a nut butter grinder.

One of the objects of the invention is to provide a food chopper which can be readily disassembled for cleaning.

Another object of the invention is to provide a device which will eliminate clogging.

Still another object of the invention is to provide a food chopper which has a much larger cutting area than devices now in use.

Yet another object of the invention is to provide a food chopper with a forcer screw which is larger in diameter at the front end and the part visible through the feed hopper than the part at the rear of the barrel, thereby increasing the forcing power against the cutting members.

A further object of the invention is to provide a food chopper with hemispherical cutting members having different exit openings.

Another object of the invention is to provide a food chopper having hemispherical cutting members with a scraper adapted to remove the chopped up material from the outer face of the rotary cutting member.

Still another object of the invention is to provide a food chopper with a hemispherical, rotary cutting member whose exit openings may be closed by means of a filling member should it be desired to grind nut butter or other similar products.

A further object of the present invention is to produce a simple and inexpensive device and yet one which will be exceedingly effective for the purpose for which it is designed.

Other objects of the invention will become apparent as the detailed description thereof proceeds.

In the drawings wherein like numerals of reference designate corresponding parts throughout the several views, Figure 1 is a vertical, longitudinal, sectional view taken through the device in accordance with the invention on line 1—1 in Figure 2.

Figure 2 is a top outline view of Figure 1.

Figure 3 is a fragmentary outline view of the rear portion of the barrel showing the hemispherical cutting member provided with exit openings having the cutting edges arranged in radial relation.

Figure 4 is a fragmentary outline side view of Figure 3.

Figure 5 is a fragmentary sectional view on line 5—5 in Figure 1.

Figure 6 shows an outline view of the food chopper with the hemispherical, rotary cutting member in assembled position.

Figure 7 is a sectional view on line 7—7 in Figure 8 showing the exit opening filler attachment, such as used for making nut-butter, by means of which the exit openings of the hemispherical barrel end may be closed up.

Figure 8 is a plan view of Figure 7.

Figure 9 is a sectional view on line 9—9 in Figure 10, showing the cap as used for making nut-butter or the like.

Figure 10 is a part inside view and part outside view of the cap shown in Figure 9.

Figure 11 represents a fragmentary assembly view of the cutting end of the food chopper, in accordance with the invention, showing the rotary cutting member and the scraper in position.

Figure 12 is a plan view of the scraper only as shown assembled in Figure 11.

Figure 13 is a sectional view on line 13—13 in Figure 14, showing the scraper locking ears on the barrel.

Figure 14 is a sectional view on line 14—14 in Figure 13, showing the attaching and locking means for the scraper shown in Figures 11 and 12.

Figure 15 is a fragmentary, sectional assembly view of the cutter end, showing the exit opening filler attachment and the cap in position.

Referring now to the drawings and especially to Figures 1 and 2, the food chopper in accordance with the present invention consists, in general, of a cylindrical, horizontally disposed barrel 20 provided with the usual integral hopper 21. The rear portion 22 of said barrel 20 is provided with a hemispherical hollow end 23 having exit openings 24 and radially disposed arms 25.

A forcer screw 26 is suitably journaled in the rear portion 22 and the front portion 27 of said barrel 20 in a manner as best shown in Figure 1.

In order to render the food chopper easily cleanable, also to readily insert or remove the forcer screw into and from the barrel 20, the latter is split along its horizontal center and is hingedly united by the hinge connection 28. Both barrel halves are securely held together, at the front end by the cup-like attaching end 29 of the crank-handle 30. This cup-like end 29 fits over the somewhat reduced cylindrical extension 31 of the barrel 20 and is held in position by means of a wing-nut 32 which engages the threads 33 of the front forcer screw extension 34. The centrally split rear end of the barrel is held together by means of the hemispherical rotary cutting member 35, the inner face 36 of which snugly engages the outer face 37 of the hemispherical rear end 22 of the barrel 20.

The hemispherical, rotary cutting member 35 is provided with an outwardly extending hub 38 having a square, central aperture 39 into which fits the square shouldered portion of the shaft extension 40 of the forcer-screw 26. The cutting member 35 is held on the latter by means of a wing-nut 32 which engages the threaded forcer-screw extension 41.

It will be observed that the forcer-screw 26 is somewhat larger in diameter in the proximity of the feeding hopper 21 so that more material may be conveyed to the cutting members and more pressure exerted against the cutting members when turning the crank-handle of the food chopper. To accommodate the enlarged diametrical portion of the forcer-screw 26, the barrel 20 is suitably enlarged as indicated by the numeral 42.

The numeral 68 (Figures 1 and 2) indicates an enlargement of the barrel 20 at the bottom of the hopper 21 and is intended to provide a larger space at that portion of the barrel to facilitate passage of large parts of food without clogging.

To drain any liquid in the barrel the bottom of the latter is provided with a drain hole 43 which may be plugged up by a cork 44, or otherwise.

Referring now to figure 6 of the drawings which represents an end assembly view of the rotary cutting member 35, it will be noted that the latter is provided with a plurality of parallelly disposed exit openings 45, while the stationary cutting portion 23 of the barrel 20 is provided with radially arranged arms thereby obtaining V-shaped exit openings 24. In order to get the best results, the outside surface 37 of the cutting portion 23 of the barrel 20 and the cooperating inside surface 36 of the rotary cutter 35 should be ground, so as to provide sharp cutting edges on the cutting portions.

Of course, the size of the exit openings of the cutting members determine the fineness or coarseness of the chopped material, large openings will produce coarse chopped material while small exit openings will produce fine chopped material.

In order to produce nut-butter with the device the attachments detailed in Figures 7, 8 and 9, 10 are used and both are shown assembled in Figure 15.

Figures 7 and 8 represent the filler attachment 46 for the exit openings 24 of the cutting end 23 of the barrel 20 and comprises a plurality of arcuate filler segments 47 having a curvature corresponding to the hemispherical contour of said cutting end 23, so that when the segments are in assembled position, that is, when inserted into the exit openings 24, both, the barrel end 23 and the filler segments 47 assume the shape of a hemispherical ball.

The aforesaid filler segments 47 are preferably integrally united with a ring 48, the inside of which fits snugly over the barrel 22, in a manner as best shown in figure 15.

Figures 9 and 10 represent a cap 49 which fits over the outer surface 37 of the cutting end 23 of the barrel 20 including the filler attachment 46.

Cap 49 consists of a hemispherical hollow body 50 which is provided with an outwardly extending central hub 51 having a square opening 52 adapted to engage the square shouldered portion of the shaft extension 40 of the forcer-screw 26. The inner wall 53 of said body 50 is provided with radial ribs 54 formed integral with said inner wall 53 and having a curvature to conform to the outer surface of the combined, assembled barrel end 23 and segment filler attachment 46. The hub is also provided with radial slots 55 adapted to serve as an exit for the finished nut-butter.

In order to facilitate grinding nuts into butter, the inner surface of the ribs 54 is provided with diagonal ridges 69 which also serve to direct the ground up butter to the exit slots 55 of the hub 51.

When assembled, the segments 47 of the filler attachment 46 do not completely close the exit openings 24 of the cutting end 23 of barrel 20, instead, a gap 70 (Figure 3) is provided in addition to the radially disposed and substantially narrow exit slots 71 (Figure 8).

The cap 49 is securely held on the square shoulder 39 of the forcer-screw extension 41 by means of the wing-nut 32.

By operating the crank 30 the cap 49 rotates with the forcer-screw 26, while the filler attachment 46 remains stationary, as will be understood.

Referring now to Figures 11 to 14 inclusive, there is shown a detachable scraper attachment 56 by means of which the chopped food usually sticking to the outer surface 57 of the rotary cutting member 35, is being removed during the chopping operation, thereby avoiding touching of the food by hand after it is chopped.

This scraper attachment 56 consists of an annular ring 58 having three or more inwardly extending, coincident lugs 59 so as to form a U-shaped portion as shown in Figure 11 of the drawings. These lugs 59, preferably integral with the outer, rear portion of the barrel 20, are intended to register with the ears 60 shown in Figure 1.

One or more arcuate scraper arms 61 of flat and stiff material may be welded or otherwise secured edgewise to the ring 58, as best shown in Figures 11 and 12. These scraper arms 61 have an inner contour corresponding to the outer surface of the rotary cutting member 35.

The scraper arms 61 are shown as having unsupported free ends 62, but if desired, a stiffening ring 63 indicated in dot and dash lines may be used.

The scraper attachment 56 may be readily attached to the food chopper barrel 20 by pushing the same with the open portions 64 of the scraper ring 58 over the ears 60 of the barrel 20 and by turning the scraper attachment to the left, or counter-clockwise, until stopped by the stop-lugs 67 (Figures 13 and 14) and retained in that position. To remove the attachment for scraping the operation is reversed.

It will be understood that in operation the food to be chopped up is placed into the hopper 21 and by turning the crank 30 the food is forced by the forcer-screw 26 against the stationary hemispherical cutting member end 23 of the barrel 20 and thence through the exit openings 24 after which the food is minced to the desired fine or coarse texture by the rotary cutting member 35.

Of course, attachments are usually furnished for fine and coarse mincing and this is accomplished by providing small or large exit openings in the cutters in order to obtain respectively fine or coarse chopped foods.

From the foregoing description, taken in connection with the drawings, it will be seen that the present invention provides a food chopper of the character set forth which is simple in construction, sanitary, one which may be easily cleaned and which is designed to carry out the objects of the invention in a reliable and efficient manner.

It will, of course, be understood that while the construction disclosed is preferred, changes for and within the scope of the appended claims may be made without departing from the spirit of sacrificing any of the advantages of the invention.

I claim:

1. A food chopper comprising a barrel provided with a hollow hemispherical rear end formed integral therewith and provided with exit openings for the passage of food; the front end of said barrel provided with a reduced cylindrical extension; a forcer-screw rotatably supported in said barrel; said barrel being split in axial alignment with said forcer-screw thereby dividing it into two halves; hinge connections for said two halves; a rotary cutting member removably secured to the front end of said forcer-screw and in superposed relations surrounding the exterior of said hemispherical rear end of the barrel thereby serving a dual purpose, as a lock for the rear end of the barrel halves and as a cutting member; a crank for turning said forcer-screw; said crank provided with a cup-like attachment end adapted to embrace said cylindrical extension of the front end of the barrel thereby locking the front end halves of said barrel and a wing-nut for retaining the crank on the forcer-screw extension.

2. A food chopper comprising a cylindrical barrel having a forcer-screw rotatably supported therein and a crank for turning the same; a hemispherical, hollow rear end for said barrel provided with exit openings; a rotary cutting member removably secured to the front end of said forcer-screw and in superposed relation bearing against the exterior surface of the hemispherical rear end of said barrel; said rotary cutting member having exit openings for the passage of food and means attached to the barrel for removing the food usually adhering to the exterior surface of said rotary cutting member during the chopping operation, said means comprising a scraper attachment having radially disposed scraper arms secured to an attachment ring adapted to engage coincident lugs on the barrel to secure same removably thereon.

FRED W. LITTEN.

REFERENCES CITED

The following references are of record in the file of this patent:

UNITED STATES PATENTS

| Number | Name | Date |
|---|---|---|
| Re. 10,717 | Shaw | Apr. 27, 1886 |
| 369,744 | Shepard | Sept. 13, 1887 |
| 522,424 | Koenen | July 3, 1894 |
| 643,547 | Smith | Feb. 13, 1900 |
| 2,281,258 | Benton | Apr. 28, 1942 |

FOREIGN PATENTS

| Number | Country | Date |
|---|---|---|
| 114,630 | Germany | Nov. 9, 1900 |
| 159,403 | Great Britain | Mar. 3, 1921 |
| 232,642 | Great Britain | May 14, 1925 |